US012629901B2

(12) United States Patent
Hayden et al.

(10) Patent No.: US 12,629,901 B2
(45) Date of Patent: May 19, 2026

(54) STRUCTURAL TILES CONSTRUCTED OF RECYCLED FIBER REINFORCED POLYMER MATERIALS FOR USE IN COMPOSITE PANELS

(71) Applicant: LM Wind Power A/S, Kolding (DK)

(72) Inventors: Paul Hayden, Romsey (GB); Huijuan Dai, Simpsonville, SC (US); Ryan Eric Vogel, Greer, SC (US); Fritz Andres Campo, Carrboro, NC (US); Raphael Sajous, Cowes (GB)

(73) Assignee: LM Wind Power A/S, Kolding (DK)

( * ) Notice: Subject to any disclaimer, the term of this patent is extended or adjusted under 35 U.S.C. 154(b) by 129 days.

(21) Appl. No.: 18/553,660

(22) PCT Filed: Mar. 30, 2022

(86) PCT No.: PCT/US2022/022436
§ 371 (c)(1),
(2) Date: Oct. 2, 2023

(87) PCT Pub. No.: WO2022/212434
PCT Pub. Date: Oct. 6, 2022

(65) Prior Publication Data
US 2024/0181723 A1      Jun. 6, 2024

Related U.S. Application Data

(60) Provisional application No. 63/170,113, filed on Apr. 2, 2021.

(51) Int. Cl.
| | |
|---|---|
| *B29C 70/42* | (2006.01) |
| *B29K 105/26* | (2006.01) |
| *B29L 31/08* | (2006.01) |

(52) U.S. Cl.
CPC .......... *B29C 70/42* (2013.01); *B29K 2105/26* (2013.01); *B29L 2031/08* (2013.01)

(58) Field of Classification Search
CPC .. B29C 70/42; B29K 2105/26; B29L 2031/08
(Continued)

(56) References Cited

U.S. PATENT DOCUMENTS

| | | |
|---|---|---|
| 2,884,078 A | 4/1959 | Stamm et al. |
| 4,045,269 A | 8/1977 | Voss et al. |
| | (Continued) | |

FOREIGN PATENT DOCUMENTS

| | | |
|---|---|---|
| AU | 2011304537 B2 | 3/2012 |
| CA | 2517951 A1 | 9/2004 |
| | (Continued) | |

OTHER PUBLICATIONS

PCT International Search Report & Opinion Corresponding to PCT/US2022/022436 on Jul. 15, 2022.

*Primary Examiner* — Christina A Johnson
*Assistant Examiner* — Xue H Liu
(74) *Attorney, Agent, or Firm* — Dority & Manning, P.A.

(57) ABSTRACT

A method for forming a structural tile for use in a composite panel includes providing a base plate of a compression mold assembly. The method also includes placing a grid structure mold of the compression mold assembly atop the base plate. The grid structure mold defines a cavity having a desired shape for a grid structure. Further, the method includes filling the cavity of the grid structure mold with a plurality of fragments of recycled fiber reinforced polymer material. Moreover, the method includes placing a cover plate of the compression mold assembly atop the grid structure mold to apply pressure to the grid structure mold. The method also includes applying heat to the cover plate to heat the plurality of fragments of recycled fiber reinforced polymer material (Continued)

such that the recycled fiber reinforced polymer material melts within the cavity. In addition, the method includes allowing the melted recycled fiber reinforced polymer material to cure to form the structural tile.

9 Claims, 14 Drawing Sheets

(58) Field of Classification Search
USPC ......................................................... 264/37.1
See application file for complete search history.

(56) References Cited

U.S. PATENT DOCUMENTS

| | | | |
|---|---|---|---|
| 4,329,119 A | 5/1982 | Baskin |
| 4,474,536 A | 10/1984 | Gougeon et al. |
| 4,976,587 A | 12/1990 | Johnston et al. |
| 5,476,704 A | 12/1995 | Köhler |
| 6,264,877 B1 | 7/2001 | Pallu De La Barriere |
| 7,473,385 B2 | 1/2009 | Stiesdal et al. |
| 7,503,752 B2 | 3/2009 | Gunneskov et al. |
| 7,625,185 B2 | 12/2009 | Wobben |
| 7,637,721 B2 | 12/2009 | Driver et al. |
| 7,654,799 B2 | 2/2010 | Eyb |
| 7,854,594 B2 | 12/2010 | Judge |
| 7,922,454 B1 | 4/2011 | Riddell |
| 8,043,065 B2 | 10/2011 | Kyriakides |
| 8,057,189 B2 | 11/2011 | Riahi |
| 8,079,818 B2 | 12/2011 | Burchardt et al. |
| 8,114,329 B2 | 2/2012 | Karem |
| 8,142,162 B2 | 3/2012 | Godsk et al. |
| 8,147,209 B2 | 4/2012 | Godsk et al. |
| 8,168,027 B2 | 5/2012 | Jacobsen et al. |
| 8,172,538 B2 | 5/2012 | Hancock et al. |
| 8,177,514 B2 | 5/2012 | Hibbard |
| 8,262,361 B2 | 9/2012 | Sanz Pascual et al. |
| 8,297,932 B2 | 10/2012 | Arocena De La Rua et al. |
| 8,297,933 B2 | 10/2012 | Riahi |
| 8,317,479 B2 | 11/2012 | Vronsky et al. |
| 8,348,622 B2 | 1/2013 | Bech |
| 8,353,674 B2 | 1/2013 | Bech |
| 8,455,090 B2 | 6/2013 | Schmidt et al. |
| 8,506,258 B2 | 8/2013 | Baker et al. |
| 8,511,996 B2 | 8/2013 | Llorente Gonzalez et al. |
| 8,517,689 B2 | 8/2013 | Kyriakides et al. |
| 8,540,491 B2 | 9/2013 | Gruhn et al. |
| 8,545,744 B2 | 10/2013 | Jones |
| 8,580,060 B2 | 11/2013 | Bech |
| 8,657,581 B2 | 2/2014 | Pilpel et al. |
| 8,673,106 B1 | 3/2014 | Jolley et al. |
| 8,696,317 B2 | 4/2014 | Rudling |
| 8,747,098 B1 | 6/2014 | Johnson et al. |
| 8,764,401 B2 | 7/2014 | Hayden et al. |
| 8,826,534 B2 | 9/2014 | Cappelli et al. |
| 8,827,655 B2 | 9/2014 | Bech |
| 8,894,374 B2 | 11/2014 | Fuglsang et al. |
| 8,918,997 B2 | 12/2014 | Kyriakides et al. |
| 8,961,142 B2 | 2/2015 | Wansink |
| 8,961,143 B2 | 2/2015 | Kulenkampff et al. |
| 8,992,813 B2 | 3/2015 | Robbins et al. |
| 9,790,919 B2 | 10/2017 | Leonard et al. |
| 10,337,490 B2 | 7/2019 | Caruso et al. |
| 10,487,797 B2 | 11/2019 | Hancock et al. |
| 10,513,810 B2 | 12/2019 | Ramachandran et al. |
| 10,947,852 B2 | 3/2021 | Schuring |
| 11,092,132 B2 | 8/2021 | Quiring et al. |
| 11,118,561 B2 | 9/2021 | Randall |
| 2006/0225278 A1 | 10/2006 | Lin et al. |
| 2007/0036659 A1 | 2/2007 | Hibbard |
| 2009/0148300 A1 | 6/2009 | Driver et al. |
| 2010/0043955 A1 | 2/2010 | Hornick et al. |
| 2010/0098549 A1 | 4/2010 | Mironov |
| 2010/0119374 A1 | 5/2010 | Wood |
| 2010/0303631 A1 | 12/2010 | Payne et al. |
| 2011/0031758 A1 | 2/2011 | Mitsuoka et al. |
| 2011/0037191 A1 | 2/2011 | Stiesdal |
| 2011/0045276 A1 | 2/2011 | Grove-Nielsen |
| 2011/0081248 A1 | 4/2011 | Hibbard |
| 2011/0103962 A1 | 5/2011 | Hayden et al. |
| 2011/0114252 A1 | 5/2011 | Partington et al. |
| 2011/0142662 A1 | 6/2011 | Fritz et al. |
| 2011/0142670 A1 | 6/2011 | Pilpel et al. |
| 2011/0206529 A1 | 8/2011 | Bell et al. |
| 2011/0243750 A1 | 10/2011 | Gruhn et al. |
| 2011/0318186 A1 | 12/2011 | Kristensen et al. |
| 2012/0034096 A1 | 2/2012 | Appleton |
| 2012/0039720 A1 | 2/2012 | Bech |
| 2012/0148404 A1 | 6/2012 | Quell et al. |
| 2012/0180582 A1 | 7/2012 | Piasecki |
| 2012/0183408 A1 | 7/2012 | Noerlem |
| 2012/0230830 A1 | 9/2012 | Lind et al. |
| 2012/0237356 A1 | 9/2012 | Mironov |
| 2012/0257984 A1 | 10/2012 | Frederiksen |
| 2012/0294724 A1 | 11/2012 | Broome et al. |
| 2013/0012086 A1 | 1/2013 | Jones et al. |
| 2013/0022466 A1 | 1/2013 | Laurberg |
| 2013/0108453 A1 | 5/2013 | Baker et al. |
| 2013/0149166 A1 | 6/2013 | Schibsbye |
| 2013/0164133 A1 | 6/2013 | Grove-Neilsen |
| 2013/0195661 A1 | 8/2013 | Lind et al. |
| 2013/0231018 A1 | 9/2013 | Kruger et al. |
| 2013/0333823 A1 | 12/2013 | Hedges et al. |
| 2014/0003955 A1 | 1/2014 | Richter |
| 2014/0003956 A1 | 1/2014 | Lull et al. |
| 2014/0023513 A1 | 1/2014 | Johnson et al. |
| 2014/0030094 A1 | 1/2014 | Dahl et al. |
| 2014/0119936 A1 | 5/2014 | Dahl et al. |
| 2014/0140855 A1 | 5/2014 | Arendt et al. |
| 2014/0271217 A1 | 9/2014 | Baker |
| 2014/0295187 A1 | 10/2014 | Jacobsen et al. |
| 2014/0301859 A1 | 10/2014 | Hancock et al. |
| 2014/0348659 A1 | 11/2014 | Stewart |
| 2015/0003991 A1 | 1/2015 | Bagepalli et al. |
| 2015/0224760 A1 | 8/2015 | Eyb et al. |
| 2015/0266249 A1 | 9/2015 | Booth et al. |
| 2015/0316023 A1 | 11/2015 | Sandercock et al. |
| 2015/0316028 A1 | 11/2015 | Brekenfeld |
| 2016/0090209 A1 | 3/2016 | Brisendine et al. |
| 2016/0377052 A1 | 12/2016 | Caruso et al. |
| 2019/0152128 A1 | 5/2019 | Tobin |
| 2019/0275707 A1 | 9/2019 | Ahmed |
| 2021/0047788 A1 | 2/2021 | Conrad |

FOREIGN PATENT DOCUMENTS

| | | |
|---|---|---|
| CA | 2526407 | 12/2004 |
| CN | 201155423 Y | 11/2008 |
| CN | 100476200 C | 4/2009 |
| CN | 101302302 B | 2/2011 |
| CN | 102705157 A | 10/2012 |
| CN | 101906251 B | 6/2013 |
| DE | 102011051172 A1 | 12/2012 |
| DE | 102012019351 A1 | 4/2014 |
| DK | 201270816 A | 1/2014 |
| DK | 201270818 A | 1/2014 |
| DK | 3505751 T3 | 4/2021 |
| EP | 2113373 B1 | 1/2011 |
| EP | 2255957 B1 | 7/2013 |
| EP | 2617558 A1 | 7/2013 |
| EP | 2679804 A1 | 1/2014 |
| EP | 2679806 A1 | 1/2014 |
| EP | 2682256 A1 | 1/2014 |
| EP | 2687557 A1 | 1/2014 |
| EP | 2455419 B1 | 3/2014 |
| EP | 1808598 B1 | 4/2014 |
| EP | 2752577 A2 | 7/2014 |
| EP | 2778393 A2 | 9/2014 |
| EP | 3155159 B1 | 4/2018 |
| GB | 2451192 A | 1/2009 |
| GB | 2455044 A | 6/2009 |
| GB | 2464539 A | 4/2010 |
| GB | 2485453 A | 5/2012 |
| JP | 2002137307 A | 5/2002 |
| JP | 2007092716 A | 4/2007 |

(56) References Cited

FOREIGN PATENT DOCUMENTS

| | | | |
|---|---|---|---|
| JP | 3930200 | B2 | 6/2007 |
| JP | 2009235306 | A | 10/2009 |
| JP | 2014015567 | A | 1/2014 |
| JP | 5439412 | B2 | 3/2014 |
| WO | WO 02/26463 | A2 | 4/2002 |
| WO | WO03082551 | A1 | 10/2003 |
| WO | WO2007/051465 | A1 | 5/2007 |
| WO | WO2008/086805 | A2 | 7/2008 |
| WO | WO2009/118545 | A1 | 10/2009 |
| WO | WO2010/025830 | A2 | 3/2010 |
| WO | WO2010/057502 | A2 | 5/2010 |
| WO | WO2010/083921 | A2 | 7/2010 |
| WO | WO2011/088834 | A2 | 7/2011 |
| WO | WO2011/088835 | A2 | 7/2011 |
| WO | WO2011/098785 | A2 | 8/2011 |
| WO | WO2011/113812 | A1 | 9/2011 |
| WO | WO2012/010293 | A1 | 1/2012 |
| WO | WO2012/042261 | A1 | 4/2012 |
| WO | WO2012/140039 | A2 | 10/2012 |
| WO | WO2012/161741 | A2 | 11/2012 |
| WO | WO2013/007351 | A1 | 1/2013 |
| WO | WO2013/060582 | A1 | 5/2013 |
| WO | WO2013/087078 | A1 | 6/2013 |
| WO | WO2013/091639 | A2 | 6/2013 |
| WO | WO2013/178228 | A1 | 12/2013 |
| WO | WO2014/001537 | A1 | 1/2014 |
| WO | WO2014/044280 | A1 | 3/2014 |
| WO | WO2014/063944 | A1 | 5/2014 |
| WO | WO2014/079456 | A1 | 5/2014 |
| WO | WO2014/079565 | A2 | 5/2014 |
| WO | WO2015/015202 | A1 | 2/2015 |
| WO | WO2018/055063 | A1 | 3/2018 |
| WO | WO2019/103825 | A2 | 5/2019 |

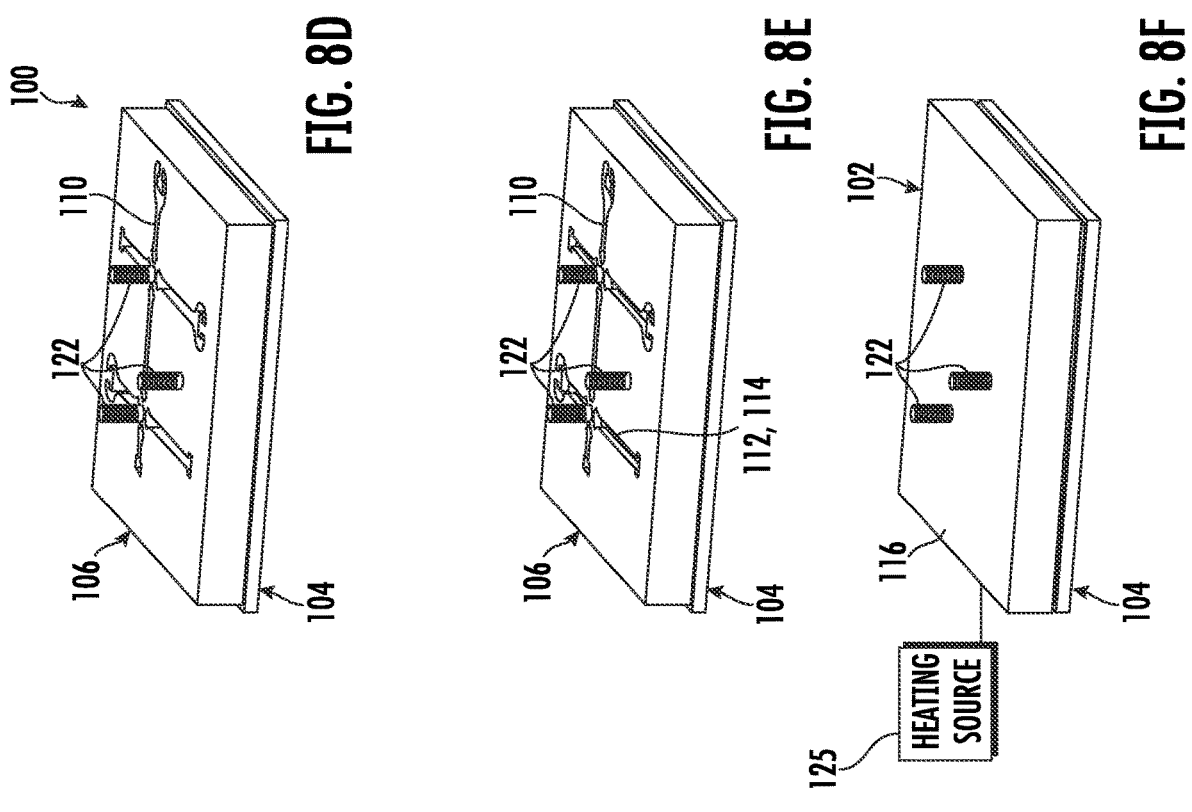
FIG. 8D
FIG. 8E
FIG. 8F
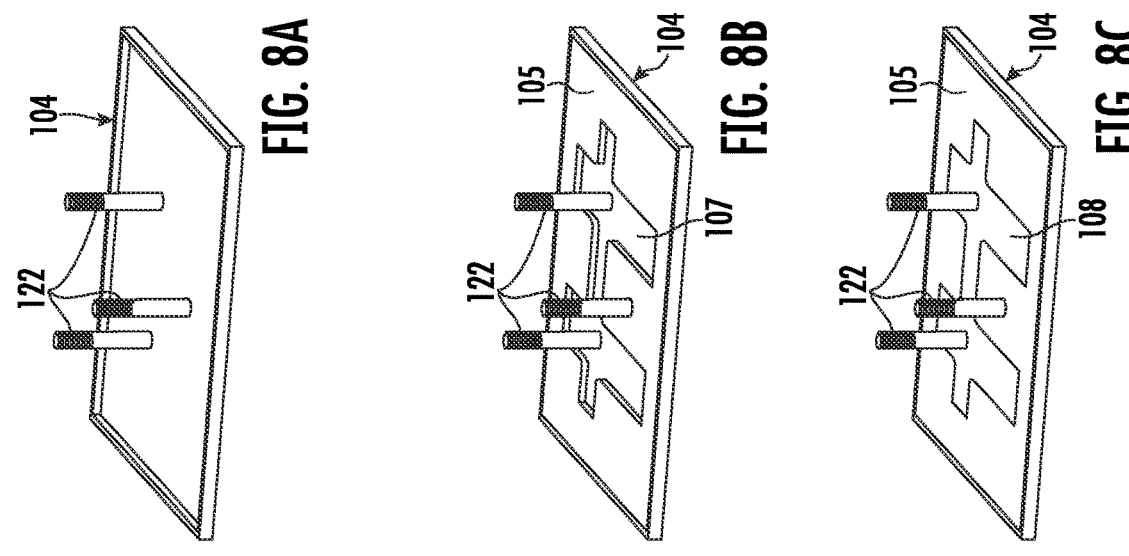
FIG. 8A
FIG. 8B
FIG. 8C

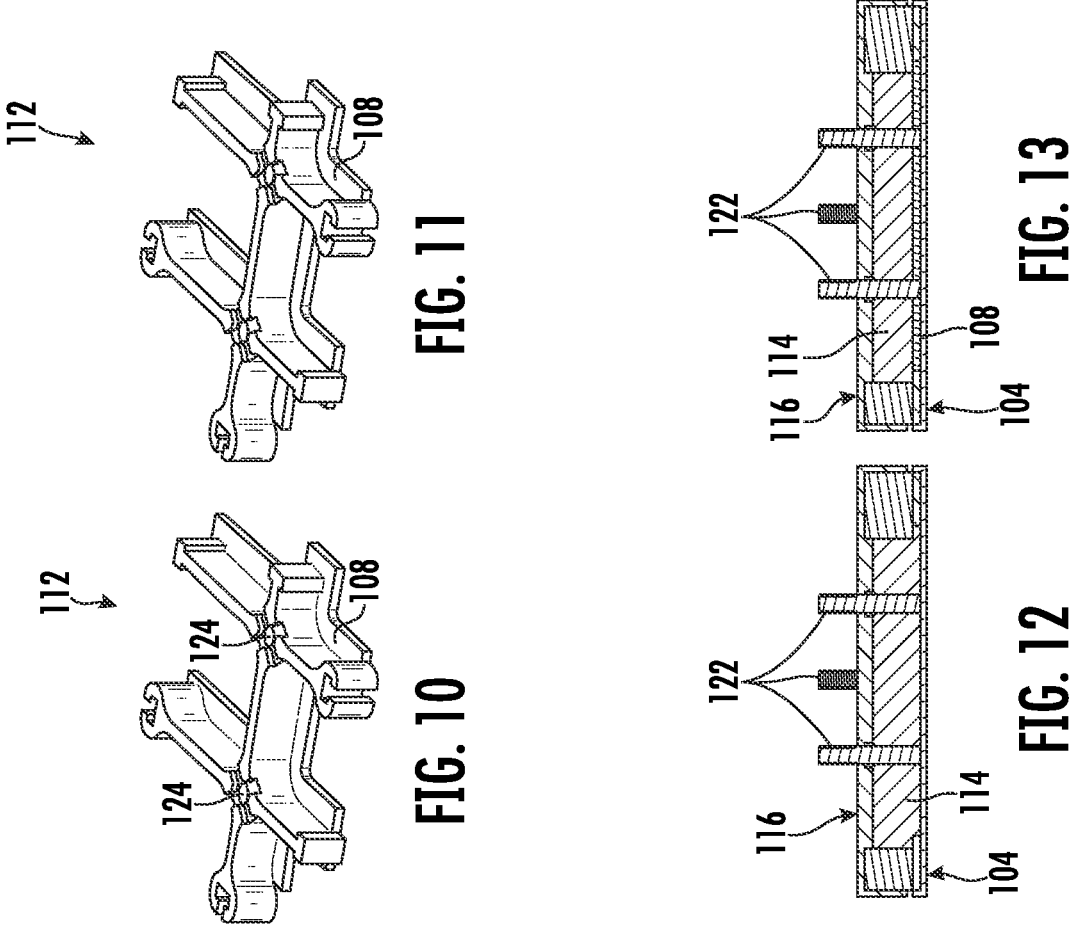
FIG. 11
FIG. 10
FIG. 13
FIG. 12
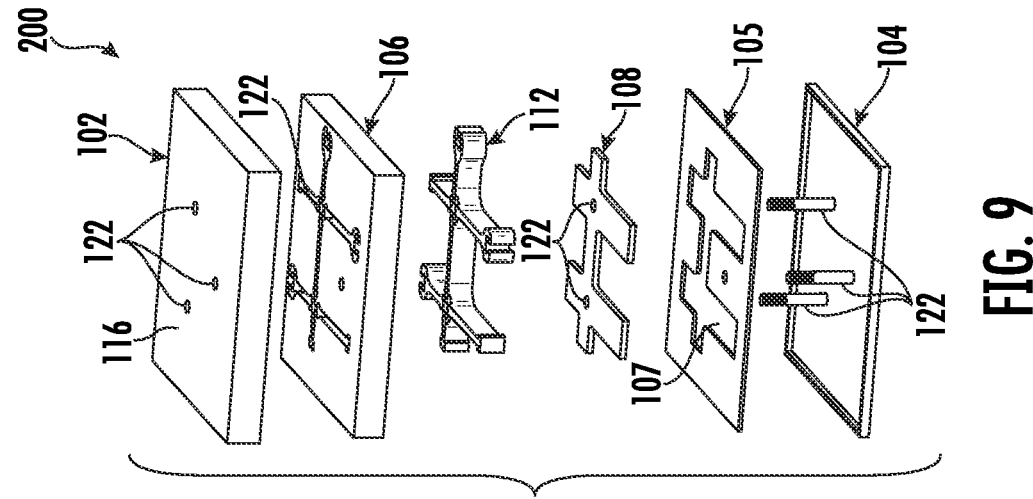
FIG. 9

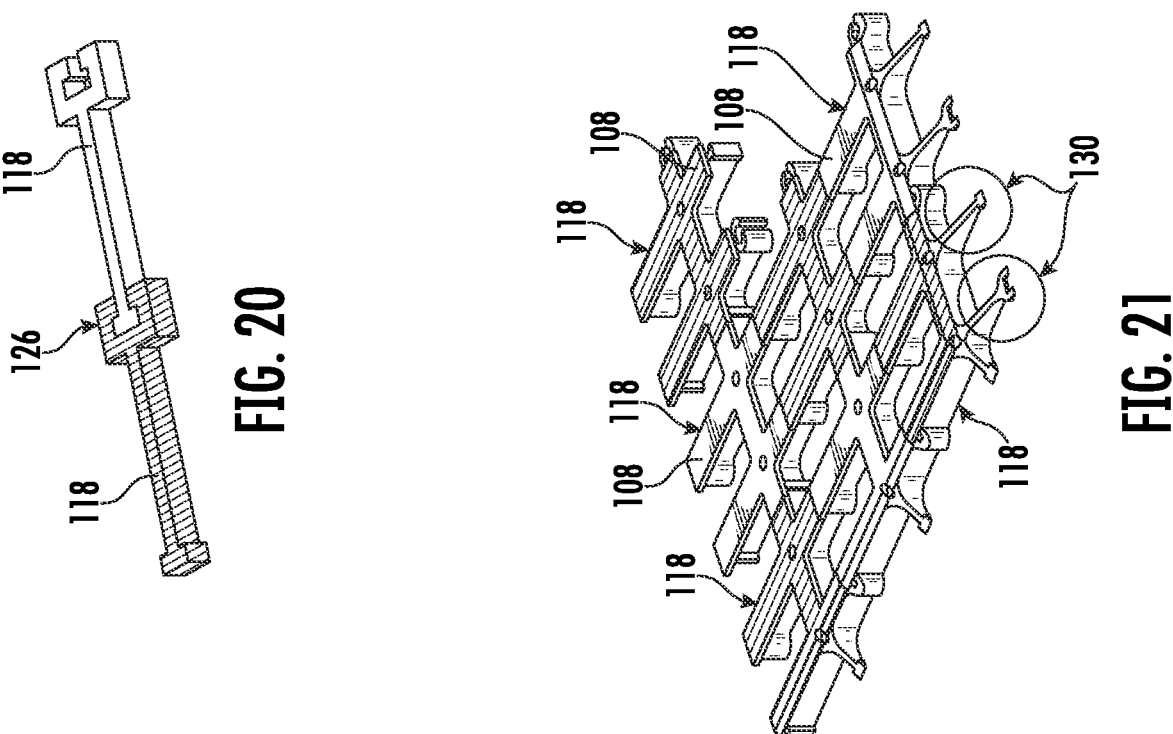
FIG. 20
FIG. 21
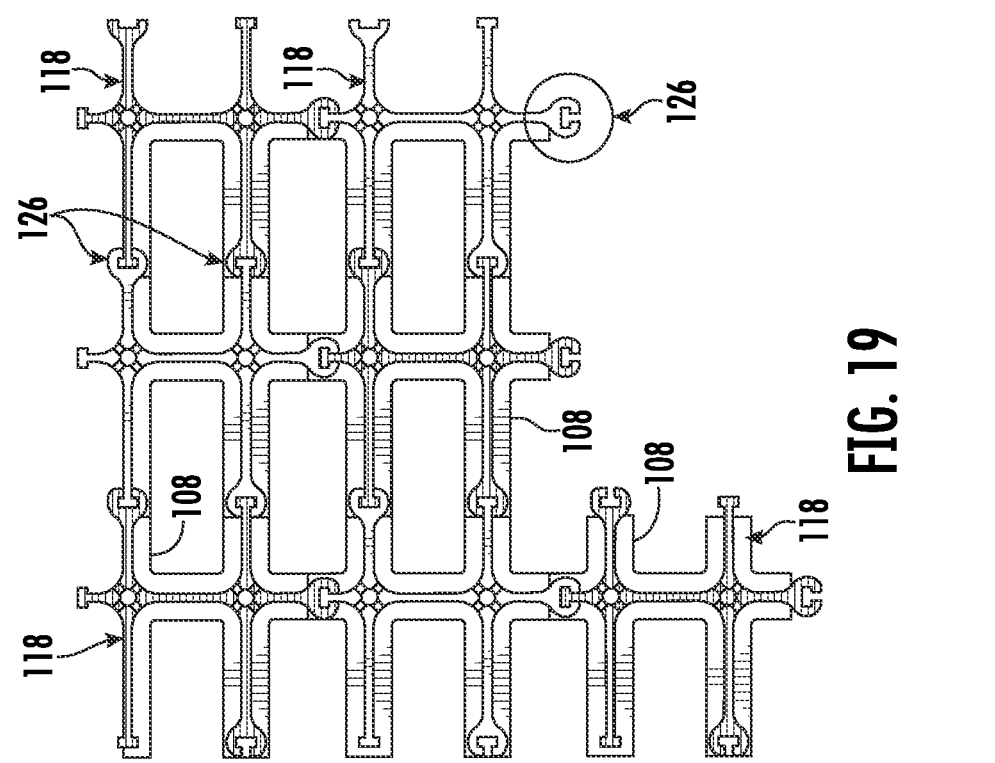
FIG. 19

STRUCTURAL TILES CONSTRUCTED OF RECYCLED FIBER REINFORCED POLYMER MATERIALS FOR USE IN COMPOSITE PANELS

CROSS-REFERENCE TO RELATED APPLICATIONS

This application claims the benefit of U.S. Provisional Patent Application No.: 63/170,113, filed on Apr. 2, 2021, and International Application No.: PCT/US2022/022436, filed on Mar. 30, 2022, which are incorporated by reference herein in their entirety.

FIELD

The present disclosure relates in general to composite panels, and more particularly to structural tiles constructed of recycled reinforced polymer materials for use in composite panels, such as rotor blades.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween).

The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together with a resin.

As rotor blades continue to increase in size, conventional infusion processes experience challenges for larger blade production (e.g., rotor blades exceeding 90 meters). Such challenges may include, for example, infusion quality issues and lengthy repair time.

Moreover, existing performance composite structures, such as those used in wind turbine rotor blades, racing yachts and/or aircraft, typically have large sections of composite sandwich panels as part of their design. These panels are typically constructed of a number of layers of fiber-reinforced polymers with a core material, such as foam, balsa wood, or similar, sandwiched therebetween. In a wind turbine rotor blade, for example, composite sandwich panels may be found in the shear webs, spar caps, aerodynamic-shaped fairings, and/or the panels that make up the aerodynamic body of the rotor blade.

However, in some instances, the supply chain for the manufacturing materials, such as the core material, may not be efficient or shortages may be present. In particular, the primary production of the input core sheets has significant waste. In addition, when the core sheets are shaped into tailored 'kits' for application in the final component, still further waste is generated. Then, when used in the final component, such core materials absorb significant amounts of resin, resulting in further associated waste and mass. In some instances, the total core material wasted through the manufacturing process can be close to 100%, and the resin absorption can be close to 10%.

As such, the art is continuously seeking new and improved methods for forming rotor blades and components thereof. Accordingly, the present disclosure is directed to structural tiles constructed of recycled reinforced polymer materials for use in composite panels, such as rotor blades and/or any other suitable application, that address the aforementioned limitations.

BRIEF DESCRIPTION

Aspects and advantages of the invention will be set forth in part in the following description, or may be obvious from the description, or may be learned through practice of the invention.

In one aspect, the present disclosure is directed to a method for forming a structural tile for use in a composite panel. The method includes providing a compression mold assembly defining a cavity having a desired shape for a grid structure. The compression mold assembly defines a cavity having a desired shape for a grid structure. Further, the method includes filling the cavity of the compression mold assembly with a plurality of fragments of recycled fiber reinforced polymer material. Moreover, the method includes applying pressure and heat to the compression mold assembly to heat the plurality of fragments of recycled fiber reinforced polymer material such that the recycled fiber reinforced polymer material melts within the cavity. In addition, the method includes allowing the melted recycled fiber reinforced polymer material to cure to form the structural tile.

In an embodiment, providing the compression mold assembly may include providing a base plate of the compression mold assembly and placing a grid structure mold of the compression mold assembly atop the base plate, the grid structure mold defining the cavity having the desired shape for the grid structure.

In another embodiment, applying the pressure and the heat to the compression mold assembly to heat the plurality of fragments of recycled fiber reinforced polymer material may include placing a cover plate of the compression mold assembly atop the grid structure mold to apply the pressure to the grid structure mold and applying heat to the cover plate to heat the plurality of fragments of recycled fiber reinforced polymer material such that the recycled fiber reinforced polymer material melts within the cavity.

In further embodiments, the method may also include placing a top skin mold atop the base plate. Thus, in an embodiment, at least a portion of the melted recycled fiber reinforced polymer material fills the top skin mold to form a top skin on the grid structure.

In alternative embodiments, the method may include providing a top skin in the top skin mold atop the base plate before filling the cavity of the grid structure mold with the plurality of fragments of recycled fiber reinforced polymer material such that the top skin is formed onto the grid structure after allowing the melted recycled fiber reinforced polymer material to cure.

For example, in an embodiment, providing the top skin in the top skin mold atop the base plate may include placing a pre-fabricated top skin in the top skin mold. Alternatively, providing the top skin in the top skin mold atop the base plate may include injecting a resin material into the top skin mold to form the top skin.

In another embodiment, the recycled polymer material may include recycled thermoplastic material. Further, in an embodiment, the method may include adding different recycled polymer materials in differing layers into the compression mold assembly to provide the grid structure with varying properties. Moreover, in an embodiment, the method may include adding one or more layers of different materials to a surface of the grid structure to improve bondability.

In further embodiments, the grid structure mold may define one or more adhesive channels formed therein for forming one or more adhesive channels into the grid structure.

In certain embodiments, the desired shape of the grid structure may include one or more tapered ends. In particular embodiments, the desired shape of the grid structure may include one or more interlocking ends.

In another aspect, the present disclosure is directed to a method of forming an article. The method includes (a) providing a base plate of a compression mold assembly. The method also includes (b) placing a grid structure mold atop the base plate, the grid structure mold defining a cavity having a desired shape for a grid structure. Further, the method includes (c) filling the cavity of the grid structure mold with a plurality of fragments of recycled fiber reinforced polymer material. Moreover, the method includes (d) placing a cover plate atop the grid structure mold to apply pressure to the grid structure mold. In addition, the method includes (e) applying heat to the cover plate to heat the plurality of fragments of recycled fiber reinforced polymer material such that the recycled fiber reinforced polymer material melts within the cavity. Thus, the method includes (f) allowing the melted recycled fiber reinforced polymer material to cure to form a structural tile. Further, the method includes (g) securing the structural tile to one or more skin layers to form the article. It should be understood that the method may further include any of the additional steps and/or features described herein.

In another aspect, the present disclosure is directed to a kit for forming a structural tile for use in a composite panel. The kit includes a compression mold assembly having a base plate, a grid structure mold for positioning atop the base plate, and a cover plate for positioning atop the grid structure mold to apply pressure to the grid structure mold. The grid structure mold defines a cavity having a desired shape for forming a grid structure. The kit further includes a plurality of fragments of recycled fiber reinforced polymer material and a heating source for applying heat to the plurality of fragments of recycled fiber reinforced polymer material such that the recycled fiber reinforced polymer material melts within the cavity and cures to form a structural tile. It should be understood that the kit may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGURES, in which:

FIGS. 8A-8F illustrates a process flow diagram of one embodiment of a method of forming an article, e.g., using a compression mold assembly, according to the present disclosure:

FIG. 9 illustrates an exploded view of one embodiment of a kit for forming an article according to the present disclosure:

FIG. 10 illustrates a perspective view of one embodiment of a grid structure of a structural tile according to the present disclosure, particularly illustrating the grid structure being the same material as the top skin:

FIG. 11 illustrates a perspective view of one embodiment of a grid structure of a structural tile according to the present disclosure, particularly illustrating the grid structure being a different material than the top skin:

FIG. 12 illustrates a cross-sectional view of the grid structure and top skin of FIG. 10:

FIG. 13 illustrates a cross-sectional view of the grid structure and top skin of FIG. 11:

FIG. 19 illustrates a top view of one embodiment of a plurality of structural tiles secured together via interlocking ends according to the present disclosure:

FIG. 20 illustrates a perspective view of one embodiment of two interlocking ends of two adjacent structural tiles according to the present disclosure:

FIG. 21 illustrates a perspective view of one embodiment of a plurality of structural tiles secured according to the present disclosure.

DETAILED DESCRIPTION

Figure 1:
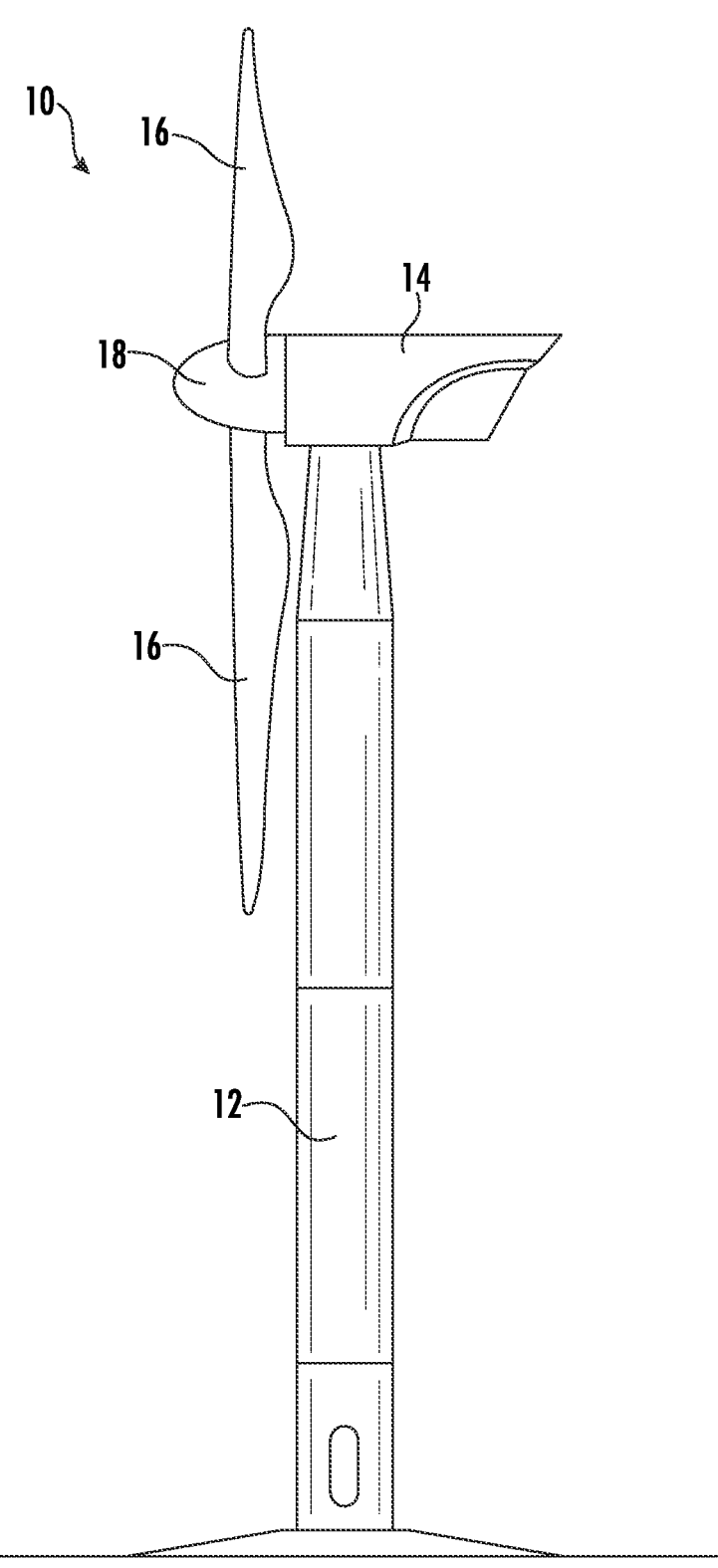
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an improved 'building block' structure or 'tile' having a skin and grid configuration for use in manufacturing rotor blade panels. In an embodiment, the structural tile may be constructed of a grid structure and at least one some skin that is made from new or recycled materials, such as recycled fiber reinforced thermoplastic material. Thus, the grid structure and the skin can be compressed using a compression mold assembly and heat to shape the components into the structural tile. As such, the grid/skin can be molded into the desired shape to form the structural tile that can then be used for a number of applications, such as rotor blades, yachts and/or aircraft.

Thus, the methods described herein provide many advantages not present in the prior art. For example, traditional sandwich core materials can be replaced with the recycled thermoplastic materials described herein, thereby reducing the associated waste. For example, the primary materials in the structural tiles described herein may be made from recycled products, e.g., rotor blade waste, which reduces cost and factory waste. Thus, the finished part is also recyclable. Further, the structural tiles allow for improved industrial and lean product and process design that is more suited to higher automation and higher throughput process lines for more efficiently producing rotor blades and blade components. More specifically, the present disclosure enables a modular non-infusion manufacturing process for forming articles, such as rotor blade components, which provides leaner and more automated processes without a wet process. During blade manufacturing, core materials consumes a significant amount of resin due to its porous structure (e.g., about four to about five kg/m²). Thus, the present disclosure also reduces resin usage, cost, and weight.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application using resin materials. Further, the methods described herein may also apply to manufacturing any similar structure that benefits from the resin formulations described herein.

Figure 2:
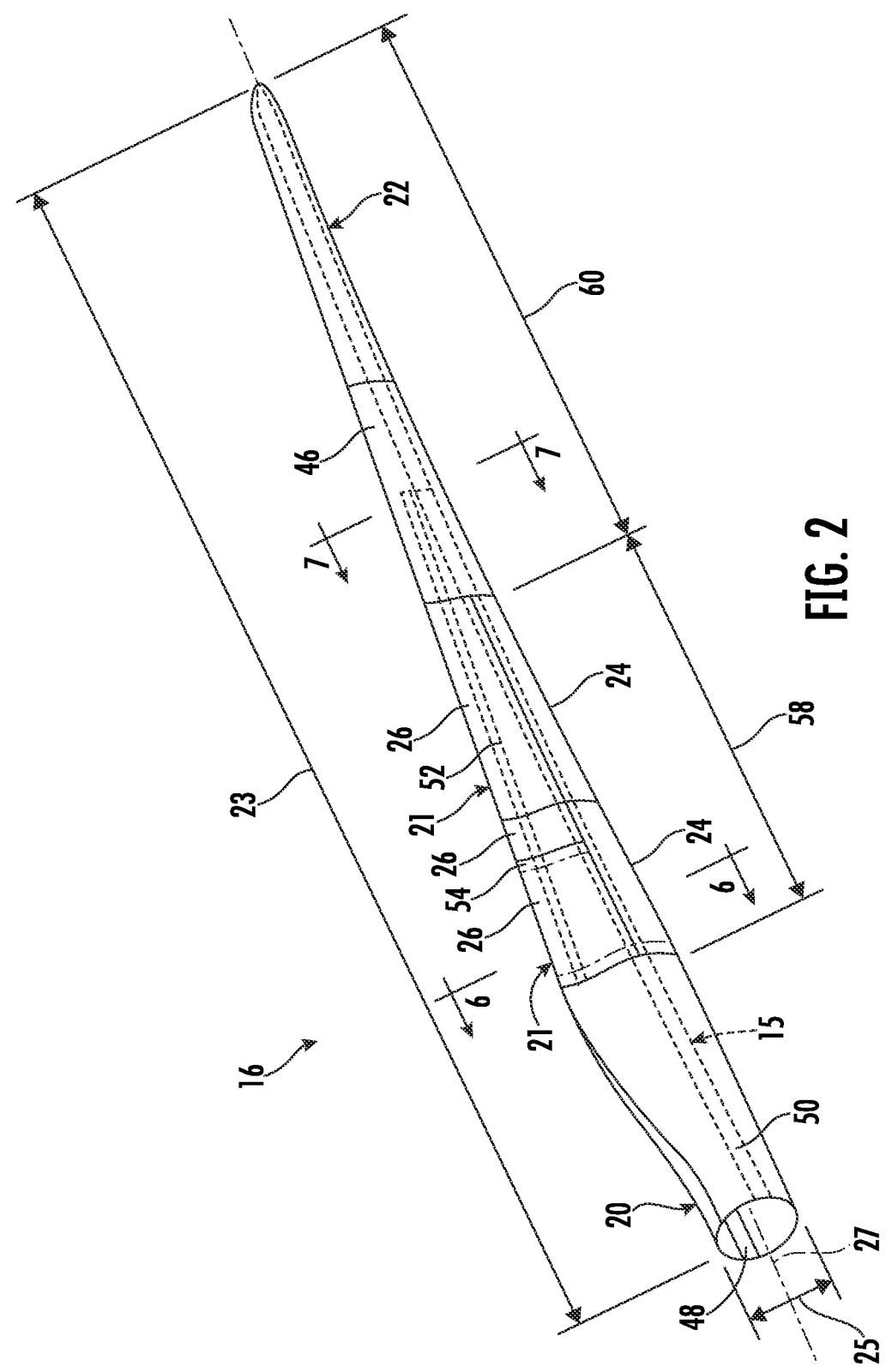
FIG. 2 illustrates a perspective view of one embodiment of a rotor blade of a wind turbine according to the present disclosure.
Figure 3:
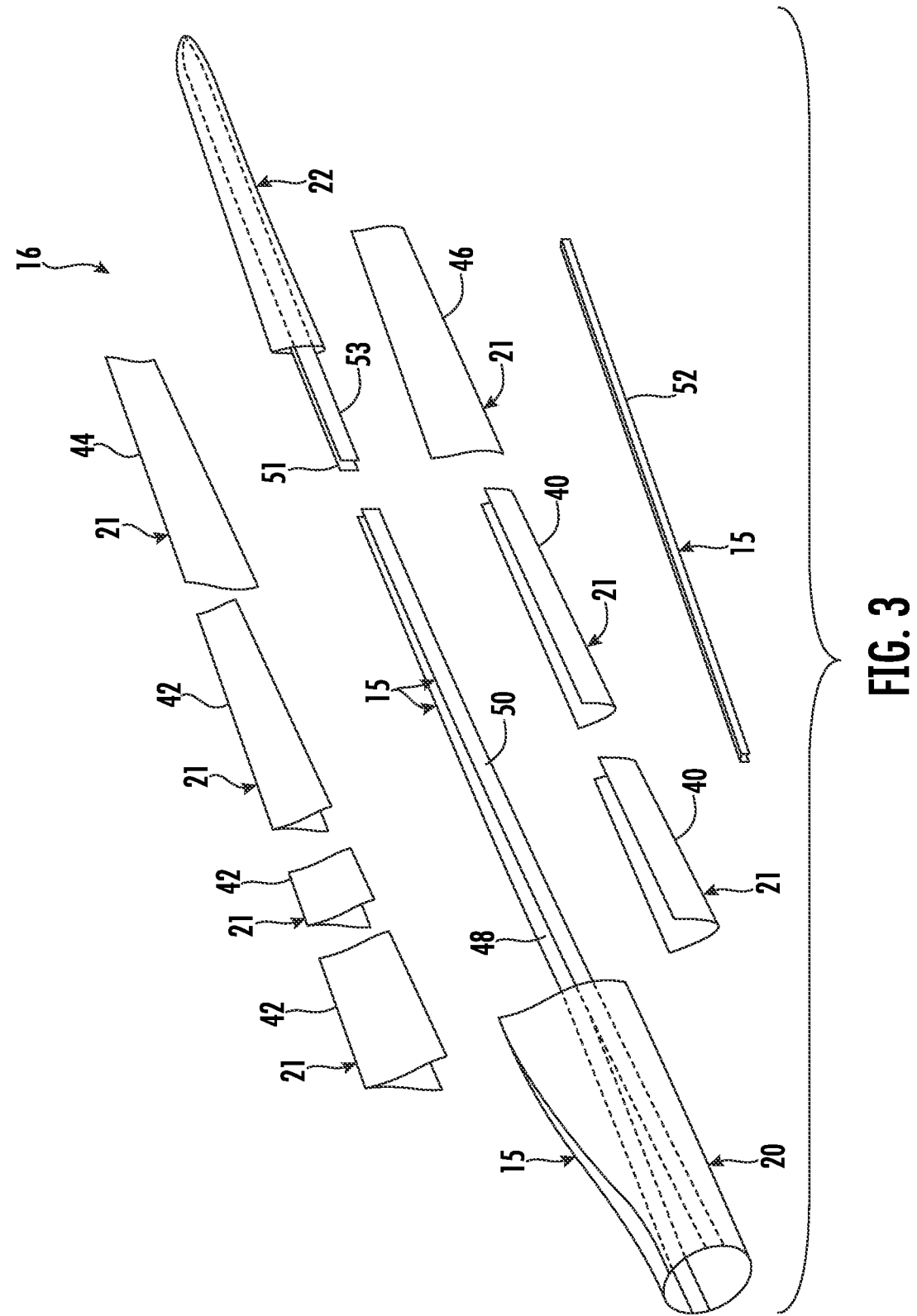
FIG. 3 illustrates an exploded view of the modular rotor blade of FIG. 2.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 and at least one blade segment 21 secured to the main blade structure 15. More specifically, as shown, the rotor blade 16 includes a plurality of blade segments 21.

Figure 6:
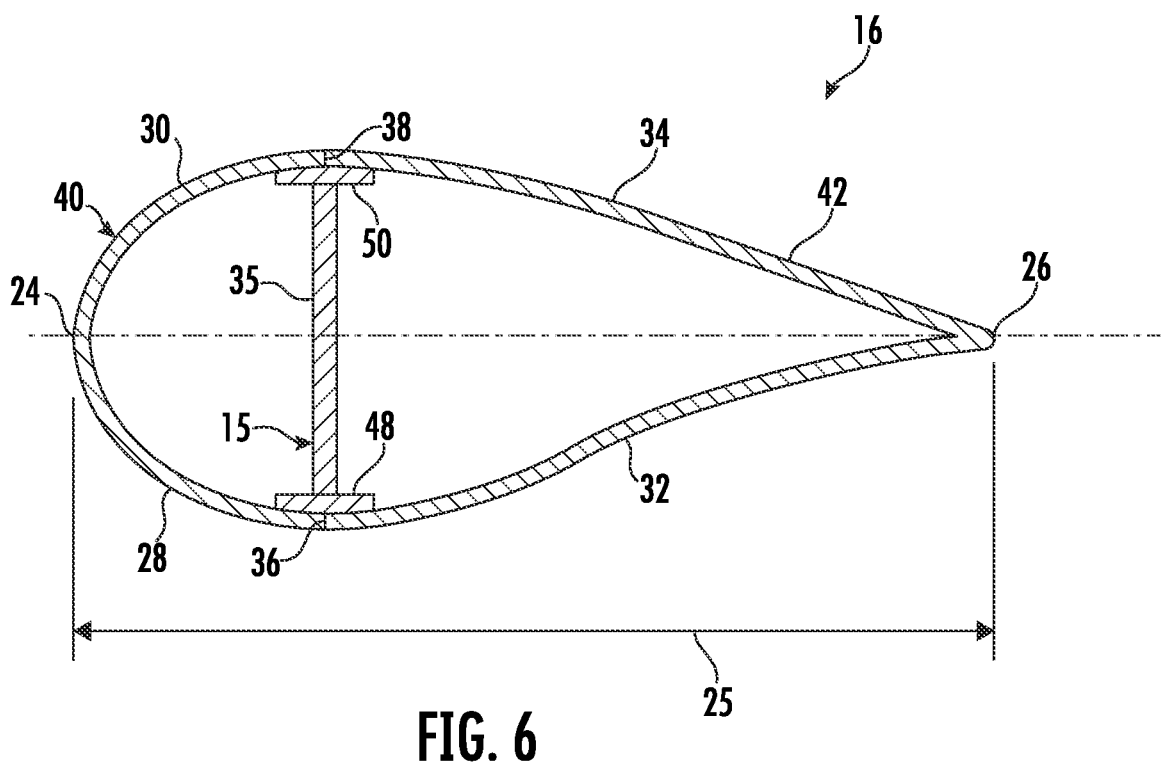
FIG. 6 illustrates a cross-sectional view of the modular rotor blade of FIG. 2 according to the present disclosure.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

Figure 4:
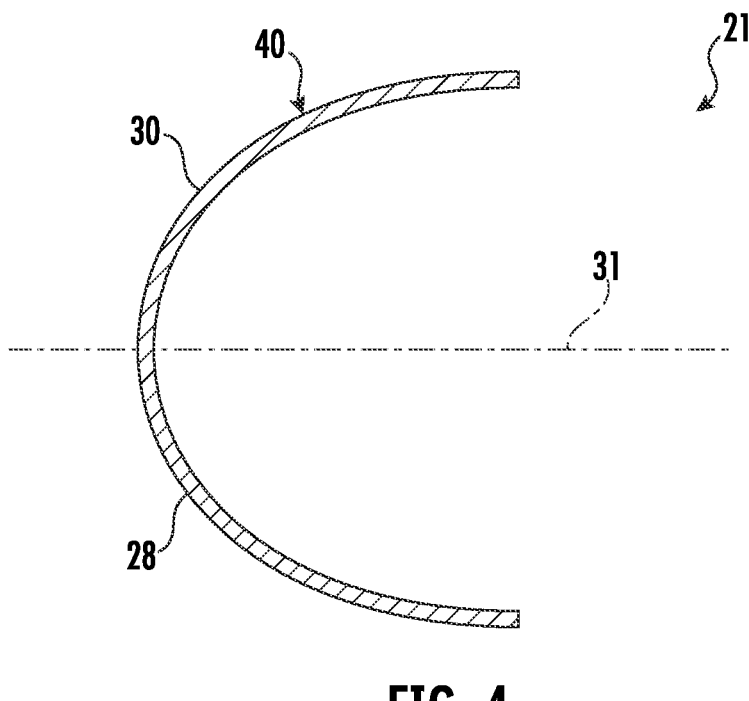
FIG. 4 illustrates a cross-sectional view of one embodiment of a leading edge segment of a modular rotor blade according to the present disclosure.

Referring particularly to FIGS. 2-4, any number of blade segments 21 or panels (also referred to herein as blade shells) having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section.

In additional embodiments, it should be understood that the blade segment portion of the blade 16 may include any combination of the segments described herein and are not limited to the embodiment as depicted. More specifically, in certain embodiments, the blade segments 21 may include any one of or combination of the following: pressure and/or suction side segments 44, 46, (FIGS. 2 and 3), leading and/or trailing edge segments 40, 42 (FIGS. 2-6), a non-jointed segment, a single-jointed segment, a multi-jointed blade segment, a J-shaped blade segment, or similar.

Figure 5:
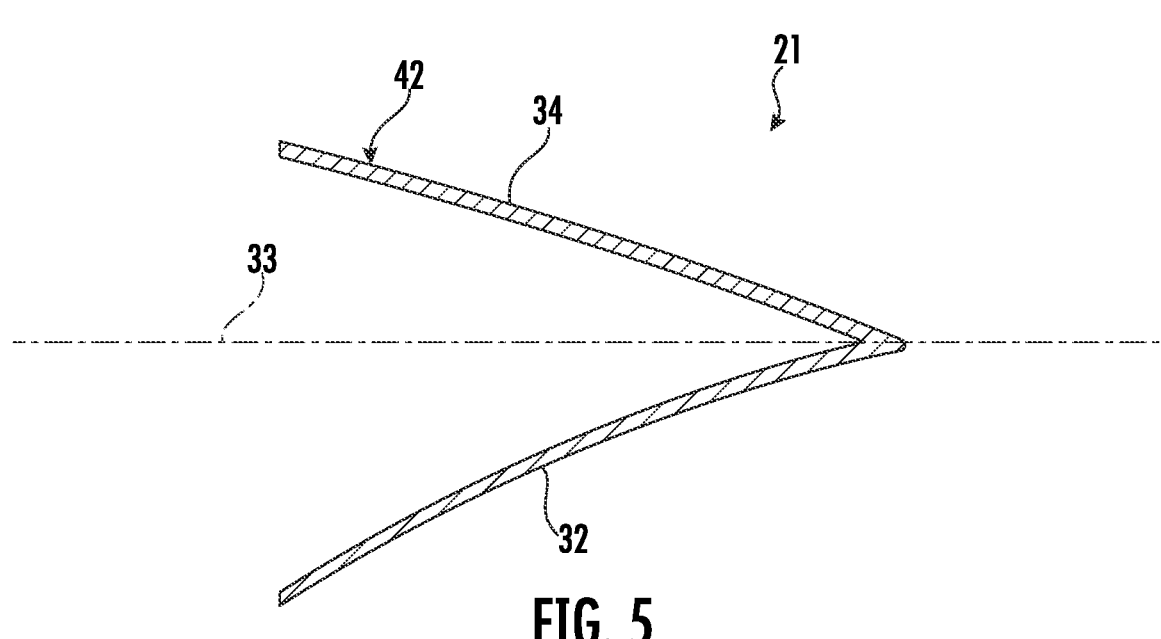
FIG. 5 illustrates a cross-sectional view of one embodiment of a trailing edge segment of a modular rotor blade according to the present disclosure.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

Figure 7:
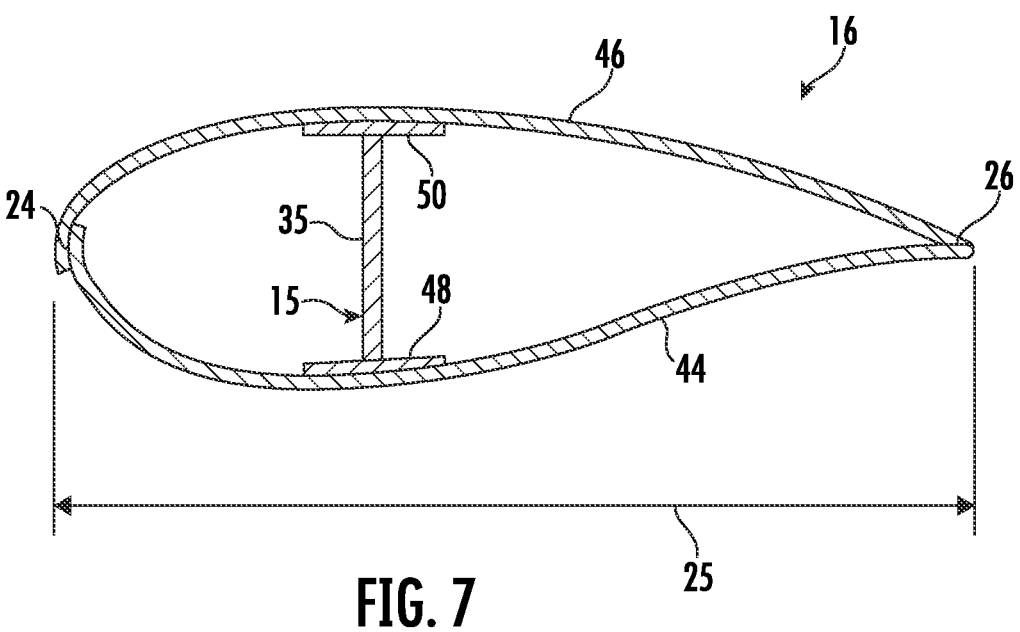
FIG. 7 illustrates a cross-sectional view of the modular rotor blade of FIG. 2 according to the present disclosure.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction so as to provide further support to the rotor blade 16. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

Referring now to FIGS. 8A-22, the present disclosure is directed to systems and methods for forming polymer articles, such as any of the rotor blade components described herein. More specifically, FIGS. 8A-8F illustrates a process flow diagram of one embodiment of a method 100 of forming an article, e.g., using a compression mold assembly 102, according to the present disclosure. FIG. 9 illustrates an exploded view of one embodiment of a kit 200 for forming an article according to the present disclosure. FIGS. 10-22 further illustrate further embodiments and details of the systems and methods for forming polymer article according to the present disclosure.

As such, in certain embodiments, the article may include a rotor blade shell (a pressure side shell, a suction side shell, a trailing edge segment, a leading edge segment, etc.), a spar cap, a shear web, a blade tip, a blade root, or any other rotor blade component. In general, the method 100 is described herein as implemented for manufacturing the rotor blade components described above. However, it should be appreciated that the disclosed method 100 may be used to manufacture any other rotor blade components as well as any other articles, such as watercraft, aircraft, or similar. In addition, although FIGS. 8A-8F depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown in FIGS. 8A and 9, the method 100 includes providing a base plate 104 of a compression mold assembly 102. As shown in FIGS. 8B and 9, the method 100 may optionally include placing a top skin mold 105 atop the base plate 104. For example, as shown, the top skin mold 105 defines a shape 107 of a top skin 108. Thus, in an embodiment, as shown in FIGS. 8C and 9, the method 100 may include providing a top skin 108 in the top skin mold 105 atop the base plate 104. Such skins, as an example, may have an I-beam configuration, or any other suitable shape to add stability and buckling resistance. Further, in an embodiment, the top skin 108 can be an isotropic or unidirectional skin.

Moreover, as shown in FIGS. 8D and 9, the method 100 includes placing a grid structure mold 106 atop the base plate 104. In such embodiments, as shown, the grid structure mold 106 defines a cavity 110 having a desired shape for forming a grid structure 112. Thus, the grid structure 112 described herein may have any suitable shape and can be designed to different shapes for different parts of the article, such as the rotor blade 16, according to local loading conditions, strength, mass, costs, etc. For example, in an embodiment, the grid structure 112 may have a honeycomb configuration to provide isotropic materials properties at the root section of the rotor blade 16 that can be optimized with ribs aligned with primary loading direction at the tip area.

In further embodiments, as shown in FIGS. 8A-8F and 9, the base plate 104, the top skin mold 105, the top skin 108, the grid structure mold 106, and/or the cover plate 116 may include one or more adhesive channels 122 formed therein, such that when the grid structure 112 is formed, one or more adhesive channels 124 are formed into the grid structure 112.

Further, as shown in FIGS. 8E and 9, the method 100 includes filling the cavity 110 of the grid structure mold 106 with a plurality of fragments of fiber reinforced polymer material 114, which may be new or recycled material. For example, in an embodiment, the recycled polymer material may include recycled thermoplastic material, such as chopped thermoplastic chips from previous blade manufacturing processes (a typical resin system could be a PMMA-based system Elium® from Arkema Corporation. Thus, in certain embodiments, by nature of being recycled from previous blade manufacturing processes, the recycled fiber reinforced polymer material 114 can have a high fiber fraction (FvF) that can be modified as needed for the compression molding techniques used herein. For example, in an embodiment, the addition of a cured MMA-based resin may be beneficial. In such embodiments, a "dry" molding compound with a reduced FvF may also improve the molding process and still offer suitable mechanical properties. Alternatively, the addition of an un-cured MMA-based resin may be beneficial. In such embodiments, a "wet" molding compound can reduce the FvF or facilitate the introduction of further dry filler or structural reinforcements like continuous dry fibers. In still further embodiments, further MMA-based resins and/or foaming/nucleating agent can be added to reduce the density of the molded part while retaining suitable mechanical properties for its application. In additional embodiments, the addition of still further thermoplastics, etc., may be added to the recycled fiber reinforced polymer material 114 to improve the material compatibility with other chemistry to improve specific properties such as bonding, UV stability, etc., and/or to benefit from the specific properties of the incorporated material.

Pre-made or pultrusion parts can also be implemented into to the recycled fiber reinforced polymer material 114 prior to fabricating the structural tiles 118. In such embodiments, the formulation of the recycled fiber reinforced polymer material 114 can be adjusted to be suitable and compatible with various inserts. Such inserts may be, for example, pre-cured composite parts, technical thermoplastic moldings (e.g., threads, fixings), pre-cured laminates, pultrusion (unidirectional reinforcements), and/or metallic or alloys components.

It should be understood that the recycled thermoplastic material may include any suitable thermoplastic, including both semi-crystalline thermoplastic materials and amorphous thermoplastic materials. In addition, such recycled thermoplastic materials are generally reinforced with fiber materials. In further embodiments, the fiber materials may include relatively long fibers, such as greater than about 10 millimeters (mm), more preferably about 15 mm, and still more preferably about 20 mm.

Exemplary semi-crystalline thermoplastic materials may generally include, but are not limited to polyolefins, polyamides, fluoropolymer, ethyl-methyl acrylate, polyesters, polycarbonates, and/or acetals. More specifically, exemplary semi-crystalline thermoplastic materials may include poly(butylene terephthalate) (PBT), poly(ethylene terephthalate) (PET), polytrimethylene terephthalate (PTT), polypropylene, poly(phenyl sulfide), polyethylene, polyamide (nylon), polyetherketone, or any other suitable semi-crystalline thermoplastic material.

Amorphous thermoplastic materials as described herein generally encompass a plastic material or polymer that is reversible in nature. For example, amorphous thermoplastic materials typically become pliable or moldable when heated to a certain temperature and returns to a more rigid state upon cooling. Some example amorphous thermoplastic materials may generally include, but are not limited to, styrenes, vinyls, cellulosics, polyesters, acrylics, polysulfones, and/or imides. More specifically, exemplary amorphous thermoplastic materials may include polystyrene, acrylonitrile butadiene styrene (ABS), poly(methyl methacrylate) (PMMA), PETG, polycarbonate, poly(vinyl acetate), amorphous polyamide, poly(vinyl chloride) (PVC), poly(vinylidene chloride), polyurethane, or any other suitable amorphous thermoplastic material. Such infusible thermoplastics can also be cast, compounded, extruded, or pultruded and may include reinforcing fibers to create pellets suitable for molding or 3-D printing processes or used in blended combination with any other suitable thermoplastic.

In addition, certain thermoplastic resins provided herein, such as PMMA and polyamides, for example, can be impregnated into structural fabrics via infusion via VARTM or other suitable infusion methods known in the art. One example of an infusible PMMA based resin system may be Elium®. In such embodiments, infusible thermoplastics can be infused into fabrics/fiber materials as a low viscosity mixture of resin(s) and catalyst.

Referring now to FIGS. 8F and 9, the method 100 includes placing a cover plate 116 atop the grid structure mold 106 to apply pressure to the grid structure mold 106. In certain embodiments, due to the potential high fiber loading of the recycled fiber reinforced polymer material 114, the molding technique used herein (e.g., press, injection, or a combination thereof) can have a desirable impact on the fiber orientation in order to benefit from predominantly from compression, shear, tensile, and/or other properties.

In addition, as shown in FIG. 8F, the method 100 may also include applying heat, e.g., via a heating source 125, to the cover plate 116 to heat the plurality of fragments of recycled fiber reinforced polymer material 114 such that the recycled fiber reinforced polymer material 114 melts within the cavity 110. Thus, the method 100 also includes allowing the melted recycled fiber reinforced polymer material 114 to cure to form a structural tile 118. Accordingly, after curing, the method 100 may further include securing the structural tile 118 to one or more skin layers to form the article.

The systems and methods for forming an article can be further understood with reference to FIGS. 10-14. In particular embodiments, as shown in FIGS. 10-13, different embodiments of the top skin 108 described herein are provided. More specifically, FIGS. 10 and 12 illustrate the grid structure 112 and the top skin 108 being formed of the same material. In such embodiments, as an example, after placing the top skin mold 105 atop the base plate 104, at least a portion of the melted recycled fiber reinforced polymer material 114 fills the top skin mold 105 to form the top skin 108 on the grid structure 112. Alternatively, FIGS. 11 and 13 illustrate the grid structure 112 and the top skin 108 being formed of different materials. For example, in such embodiments, providing the top skin 108 in the top skin mold 105 atop the base plate 104 may include placing a pre-fabricated top skin, e.g., as shown in FIG. 9, in the top skin mold 105. In still further embodiments, providing the top skin 108 in the top skin mold 105 atop the base plate 104 may include injecting a resin material into the top skin mold 105 to form the top skin 108.

Figure 14B:
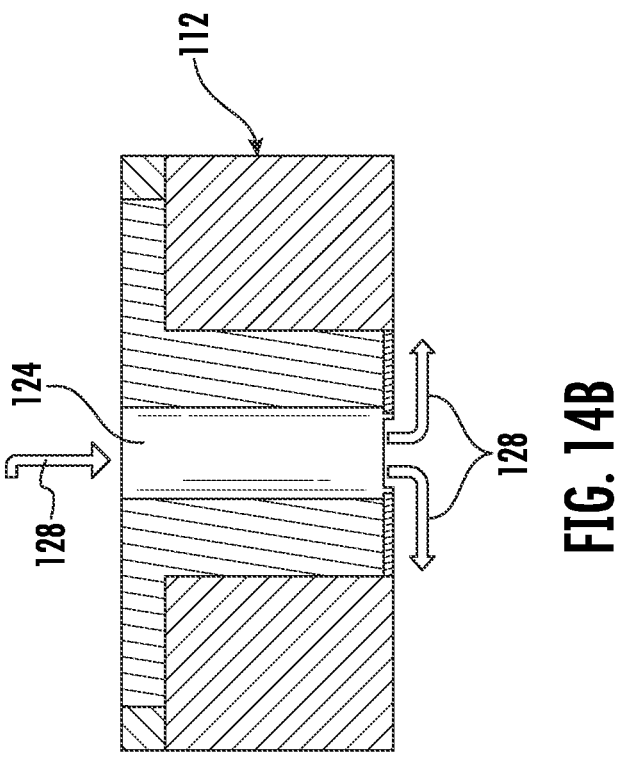
FIG. 14B illustrates a cross-sectional view of one embodiment of a structural tile according to the present disclosure, particularly illustrating an adhesive channel formed into a grid structure of the structural tile.
Figure 14A:
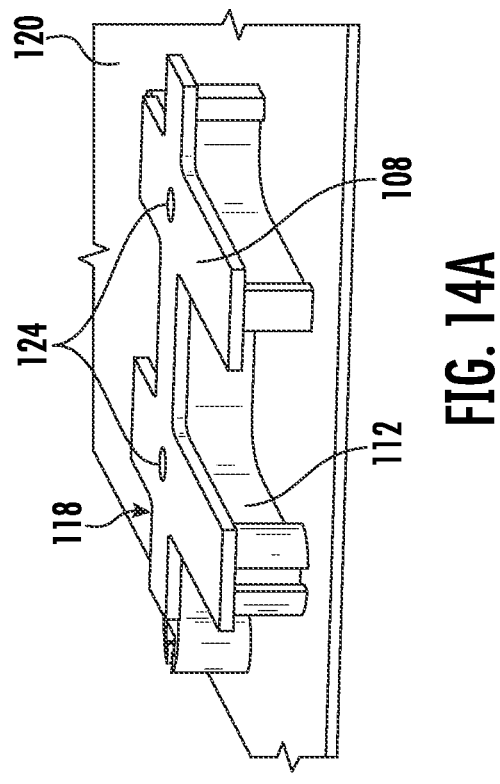
FIG. 14A illustrates a perspective view of one embodiment of a structural tile secured to a skin layer to form an article according to the present disclosure.

Referring now to FIG. 14A, the structural tile 118, which may include both the grid structure 112 and the top skin 108, may then be placed adjacent to and secured to one or more skin layers 120 for further forming the article. In certain embodiments, wherein the skin layer(s) 120 are used to form a rotor blade panel, as an example, the skin layer(s) 120 may be curved. Further, the structural tile(s) 118 can be bonded to the skin layer(s) 120 using any suitable means, such as via adhesive bonding or welding. More specifically, in an embodiment, adhesive bonding may include manually bonding, automatic dispense (e.g., tape laying) and/or point bonding. In such embodiments, pressure sensitive adhesives may be used. More particularly, the adhesive channels 122, 124 described herein are also provided to assist with the adhesive bonding process. For example, as shown in FIG. 14B and particularly illustrated via arrows 128, adhesive can be provided through the formed adhesive channels 124 and can flow through the channels 124 and out of the bottom of the grid structure 112 between the grid structure 112 and the skin layer(s) 120. As such, the structural tiles 118 can be easily secured to the skin layer(s) 120. In further embodiments, welding may include hot welding, solvent welding, cement welding, friction stirring welding, thermoplastic welding, or similar.

In still further embodiments, the skin layer(s) 120 can be dry fiber such that mechanical locking to the fiber can assist with the shear loading weakness in the resin. In additional embodiments, the structural tiles 118 may also be pre-assembled prior to placement in the final blade shell. This will depend on a number of factors, such as accuracy, speed of process, and/or factory flow/access to mold, etc.

In certain embodiments, the skin layer(s) 120 described herein may be constructed to Elium® resin with a resin-rich Elium® surface or with PMMA film. Still another embodiment may include an Elium®-based skin with a polycarbonate film. In particular, in an embodiment, Elium® may be used in combination with PETG and/or the other thermoplastic polyesters (such as PET, PBT etc.). In such embodiments, these combinations can be customized and/or improved upon to prevent Elium® from attacking certain films that form part of the finished article.

In further embodiments, the materials of the skin layer(s) 120 may selected such that the materials can be recycled. In such embodiments, extra polymer resin formulation, as well as process scrap, can be recycled by grinding materials and re-compounding the ground material into pellets that can be molded into new parts, such as new grid structures 112. For example, in one embodiment, the recycled pellets may be used in subsequent grid forming, injection molding, or extruded into other parts for use in other applications. In addition, a foaming agent may be added to the grid structure(s) 112 for reducing a density thereof.

Once the structural tiles 118 are formed, they may be further processed to include a bonding surface, which may be prepared by removal of peel ply, surface abrasion, etc. if required. Moreover, in certain embodiments, the structural tiles 118 described herein may be manufactured as relatively small pieces or components that can be joined with other structural tiles, for example, through either mechanical or chemical methods. For example, in an embodiment, the structural tiles 118 may be formed such that an operator can easily carry and maneuver the tiles 118 from one location to another at a manufacturing facility. In one embodiment, as an example, the structural tiles 118 may range from about 200 mm to about 300 mm in one dimension. In still further embodiments, wherein the skin layer(s) 120 are used to form a rotor blade panel and are thus curved, the small size of the structural tiles 118 allows the tiles 118 to be arranged in a manner than can accommodate the curvature of the skin layer(s) 120. In such embodiments, with the structural tiles

118 having such small dimensions, the curvature of the skin layer(s) 120 can be absorbed within the within the adhesive layer.

Furthermore, in an embodiment, the structural tiles 118 can be placed into the blade skin shell in a planned arrangement and held in place by adhesive. In such embodiments, the adhesive can either be applied to the shell or the tile 118 before placement or it may be injected into the interface (through the integral adhesive channels 124) after the tile has been placed. In addition, in certain embodiments, the adhesives used can have a very fast cure time (i.e., on the order of seconds). Moreover, the adhesive(s) described herein may be chemically catalyzed/cured or initiated with heat and/or ultraviolet light.

Figure 15:
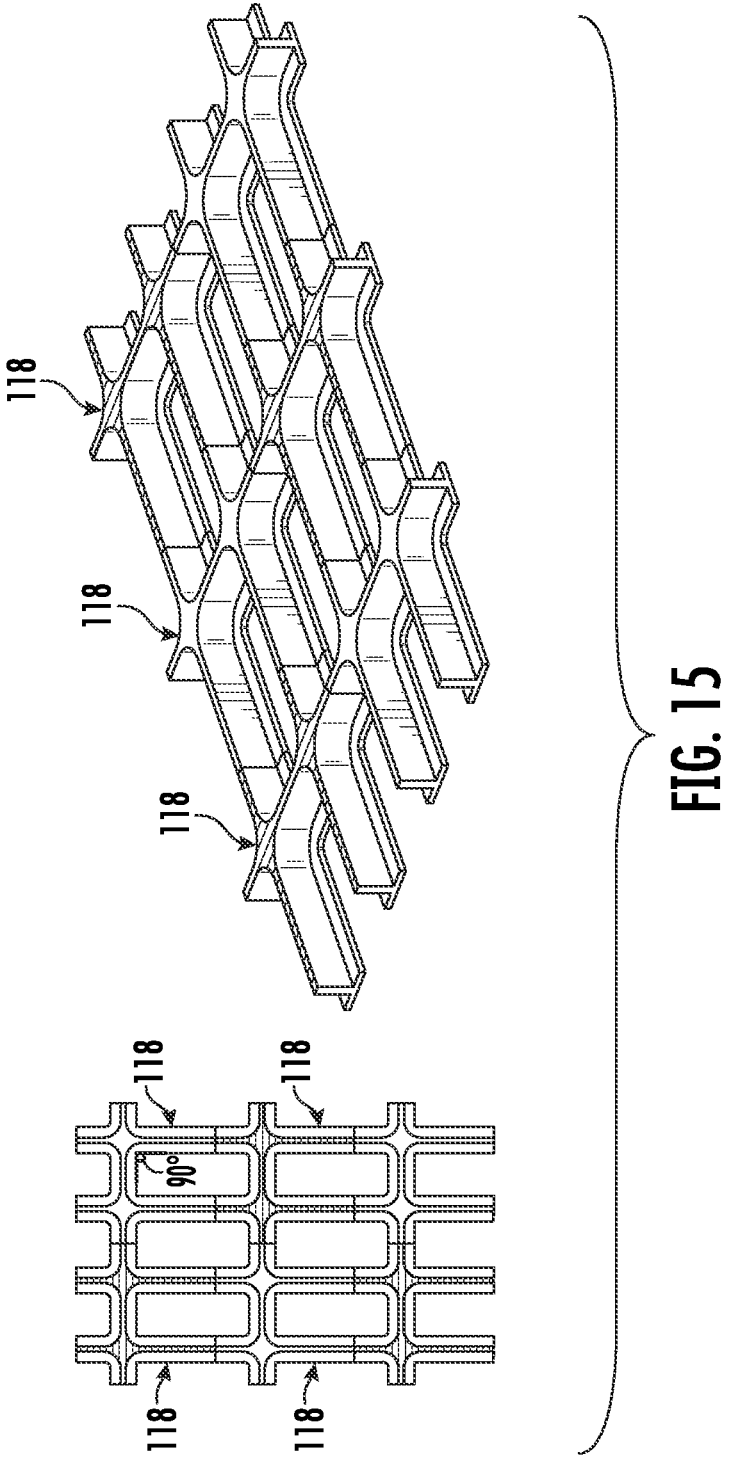
FIG. 15 illustrates a top view and a perspective view of one embodiment a plurality of structural tiles arranged in a 90-degree configuration according to the present disclosure.
Figure 16:
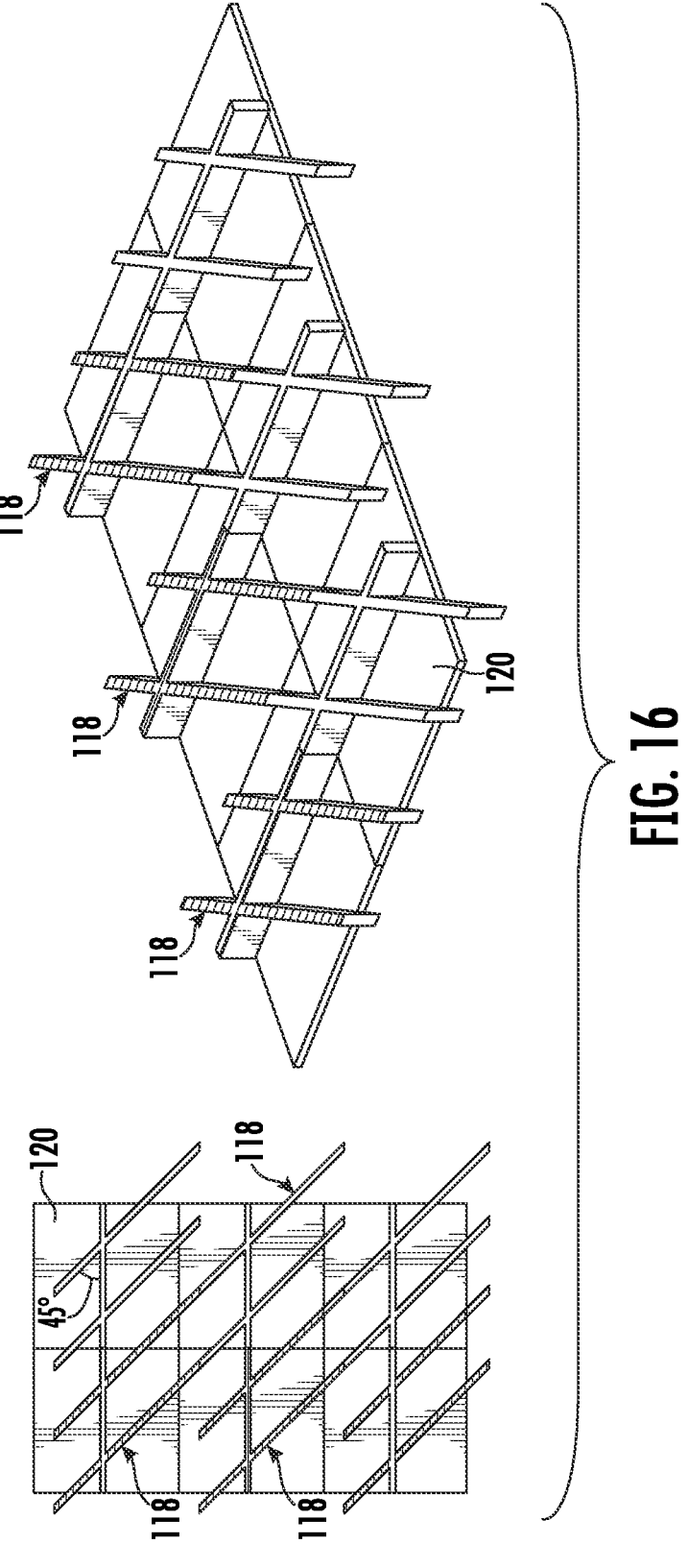
FIG. 16 illustrates a top view and a perspective view of one embodiment of a plurality of structural tiles arranged in a 45-degree inline configuration according to the present disclosure.
Figure 17:
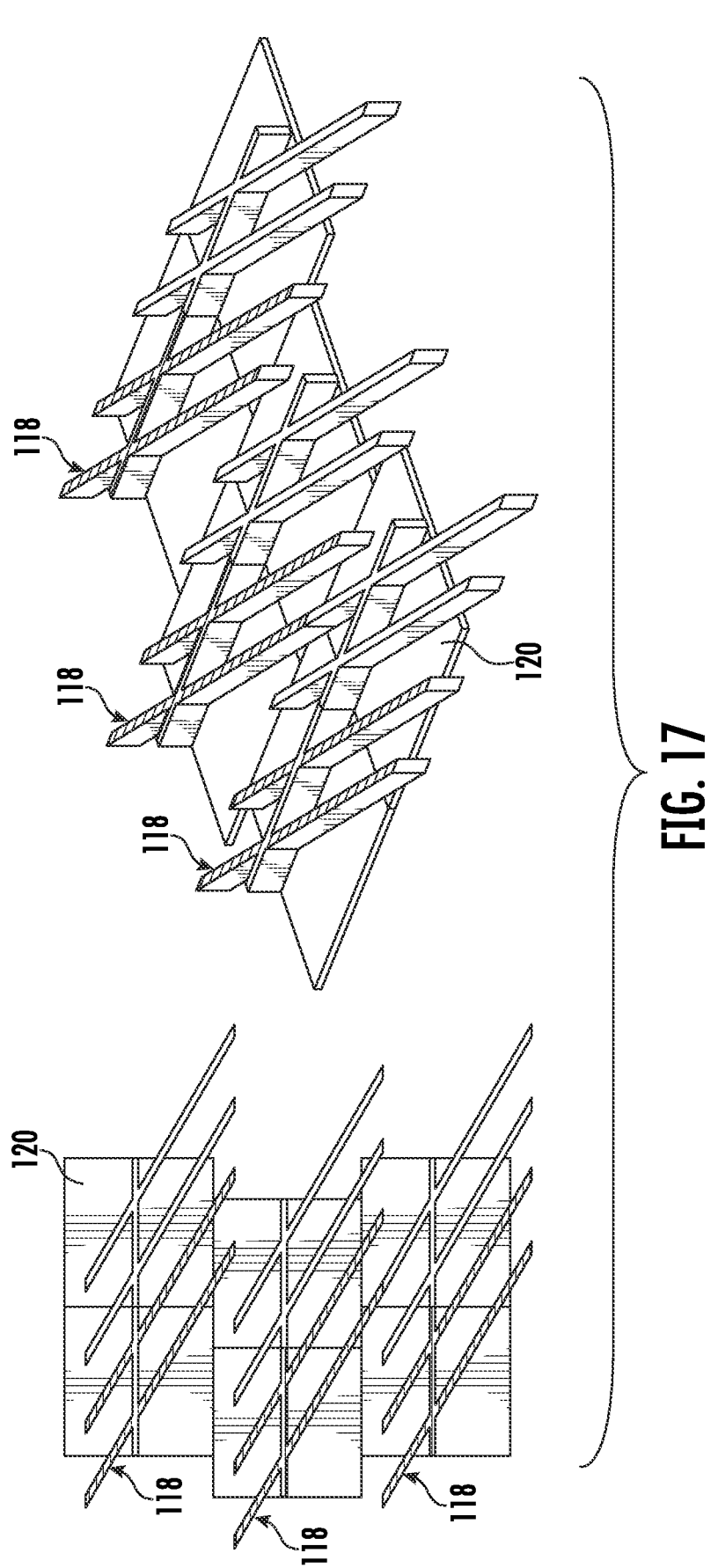
FIG. 17 illustrates a top view and a perspective view of one embodiment of a plurality of structural tiles arranged in a 60-degree inline configuration according to the present disclosure.
Figure 18:
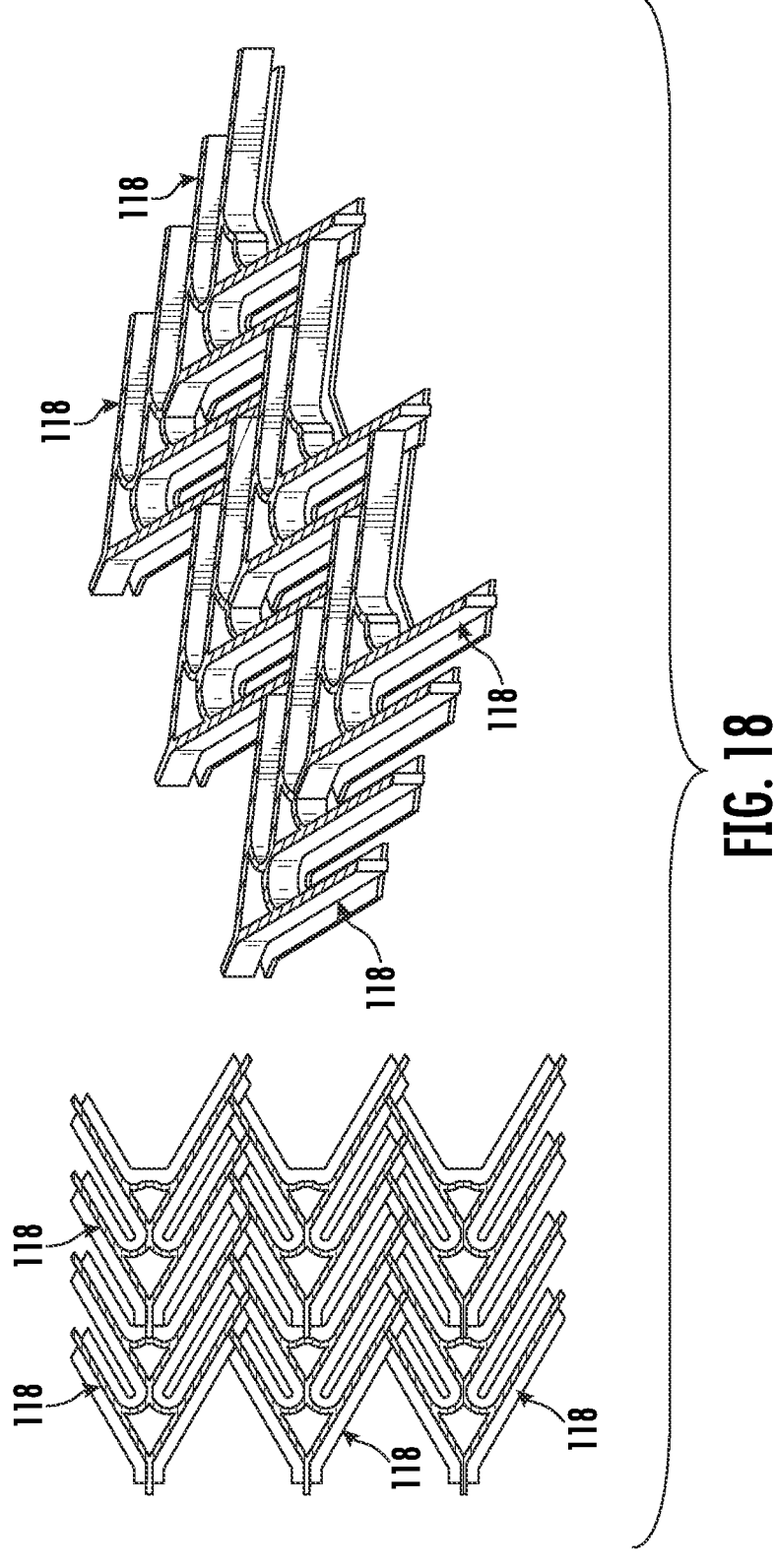
FIG. 18 illustrates a top view and a perspective view of one embodiment of a plurality of structural tiles arranged in a 60-degree alternating configuration according to the present disclosure.

Referring now to FIGS. 15-18, different embodiments of the structural tiles 118 described herein are illustrated. FIG. 15 illustrates a plurality of structural tiles 118 arranged in a 90-degree configuration. FIG. 16 illustrates a plurality of structural tiles 118 arranged in a 45-degree inline configuration. FIG. 17 illustrates a plurality of structural tiles 118 arranged in a 60-degree inline configuration. FIG. 18 illustrates a plurality of structural tiles 118 arranged in a 60-degree alternating configuration. Still further configurations are also within the spirit and scope of the present disclosure.

Referring now to FIGS. 19-21, and as previously mentioned, the grid structures 112 of the individual structural tiles 118 may be formed with any suitable geometry. For example, in a typical region of the rotor blade 16, the majority of the structural tiles 118 may be standard dimensions and pattern. However, in certain embodiments, the design may require that the leading and trailing edges of each region have a tapered reduction in height. More specifically, as shown in FIG. 21, the geometry of the structural tile(s) 118 can include one or more tapered ends 130, i.e., to assist with load transformation through the structural tiles 118 to the one or more skin layers 120.

Furthermore, as shown in FIGS. 19 and 20, the desired shape of the grid structures 112 may include one or more interlocking ends 126. More specifically, in an embodiment, each tile 118 can be connected to its neighboring tile with an interlocking joint/overlapping joint with some rotational flexibility, if desired. Thus, in such embodiments, the structural tiles 118 can be arranged onto the skin layer(s) 120 and easily secured together to provide any desired strength, buckling resistance, etc. to the panel being formed.

Figure 22:
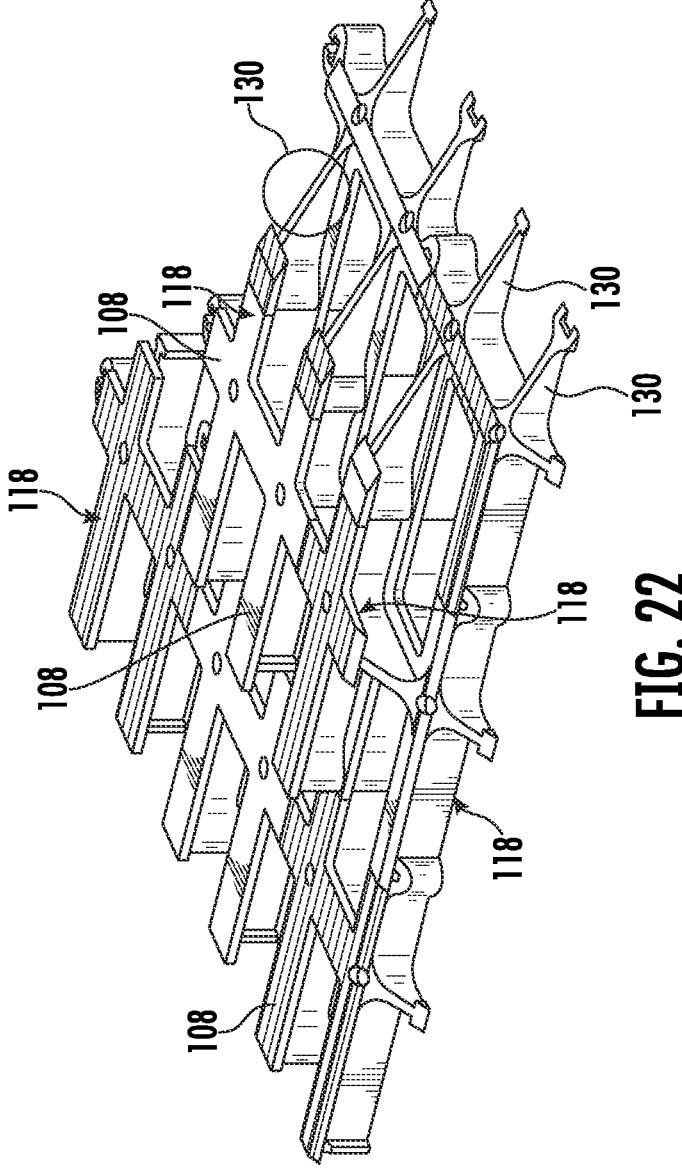
FIG. 22 illustrates a perspective view of one embodiment of a plurality of structural tiles secured according to the present disclosure, particularly illustrating the structural tiles in a stacked configuration.

In additional embodiments, as shown in FIG. 22, one or more of the grid structures 112 may also be stacked to achieve the desired height of the structural tile(s) 118, with a transition element for the height and for the grid density. In such embodiments, the structural tiles may be arranged such that the overall structural has a varying height (i.e., the height is greater at the center as shown, or in any other suitable location). Moreover, as shown, the different layers of the stacked structure may also have tapered ends 130. In addition, the design may also call for adjustment in height in the spanwise/radial direction of the rotor blade 16. Such modifications can be achieved either by having structural tiles 118 of customized heights in the different spanwise zones or by each structural tile 118 being composed of a number of smaller height tiles and the number being changed as required between radial zones.

In addition to the molding techniques described herein, pre-fabricated and/or pre-cured inserts made of a similar thermoplastic material(s), compatible thermoset material(s), and/or glass/carbon fiber reinforcements may also be positioned locally in the grid structure mold 106 such that a strong connection with the recycled fiber reinforced polymer material 114 is created when the combination of pressure and temperature described above is applied.

Moreover, in alternative embodiments, the recycled fiber reinforced polymer material 114 may be melted first, such that the melted recycled fiber reinforced polymer material 114 is injected into the grid structure mold 106, using, for example, an injection screw. In such embodiments, the fibers may be oriented within the grid structure mold 106, thereby providing desirable anisotropic properties to the component. In yet another embodiment, a combination of injection molding and press molding may also be used.

When using un-cured material in a press molding, shrinkage can occur. However, in such embodiments, this shrinkage can be controlled. In an embodiment, for example, the shrunk part may remain on one side of the grid structure mold 106, with the opposite side being a void or cavity due to the shrinkage. In this localized cavity and prior to the end of the molding cycle, a resin rich layer or a similar chemistry or other type of chemistry and with specific properties (e.g., adhesive, environmental stability, aspect, etc.) may be injected and set in-situ. This resin rich layer may be used either as an adhesive when re-heated to a high temperature or be the base to facilitate adhesion to other substrates.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a structural tile for use in a composite panel, the method comprising:

providing a compression mold assembly defining a cavity having a desired shape for a grid structure;

filling the cavity of the compression mold assembly with a plurality of fragments of recycled fiber reinforced polymer material;

applying pressure and heat to the compression mold assembly to heat the plurality of fragments of recycled fiber reinforced polymer material such that the recycled fiber reinforced polymer material melts within the cavity;

allowing the melted recycled fiber reinforced polymer material to cure to form the structural tile; and securing the structural tile to one or more skin layers to form an article;

wherein the compression mold assembly further defines one or more adhesive channels formed therein for forming one or more adhesive channels into the structural tile, wherein securing the structural tile to the one or more skin layers to form the article further comprises injecting adhesive through one or more adhesive channels formed in the structural tile such that the adhesive flows through the one or more adhesive channels and the one or more skin layers.

2. The method of claim 1, wherein providing the compression mold assembly further comprises:

providing a base plate of the compression mold assembly; and placing a grid structure mold of the compression mold assembly atop the base plate, the grid structure mold defining the cavity having the desired shape for the grid structure.

3. The method of claim 2, wherein applying the pressure and the heat to the compression mold assembly to heat the plurality of fragments of recycled fiber reinforced polymer material further comprises:

placing a cover plate of the compression mold assembly atop the grid structure mold to apply the pressure to the grid structure mold; and applying heat to the cover plate to heat the plurality of fragments of recycled fiber reinforced polymer material such that the recycled fiber reinforced polymer material melts within the cavity.

4. The method of claim 2, further comprising placing a top skin mold atop the base plate.

5. The method of claim 4, wherein at least a portion of the melted recycled fiber reinforced polymer material fills the top skin mold to form a top skin on the grid structure.

6. The method of claim 4, further comprising providing a top skin in the top skin mold atop the base plate before filling the cavity of the grid structure mold with the plurality of fragments of recycled fiber reinforced polymer material such that the top skin is formed onto the grid structure after allowing the melted recycled fiber reinforced polymer material to cure.

7. The method of claim 1, wherein the article comprises at least one of a rotor blade shell, a spar cap, a shear web, a blade tip, or a blade root.

8. The method of claim 1, further comprising adding different recycled polymer materials in differing layers into the compression mold assembly to provide the grid structure with varying properties.

9. The method of claim 1, further comprising adding one or more layers of different materials to a surface of the grid structure to improve bondability.

* * * * *